Oct. 31, 1961 K. M. HOLLAND 3,006,798
METHOD OF MAKING HONEYCOMB
Filed March 23, 1959
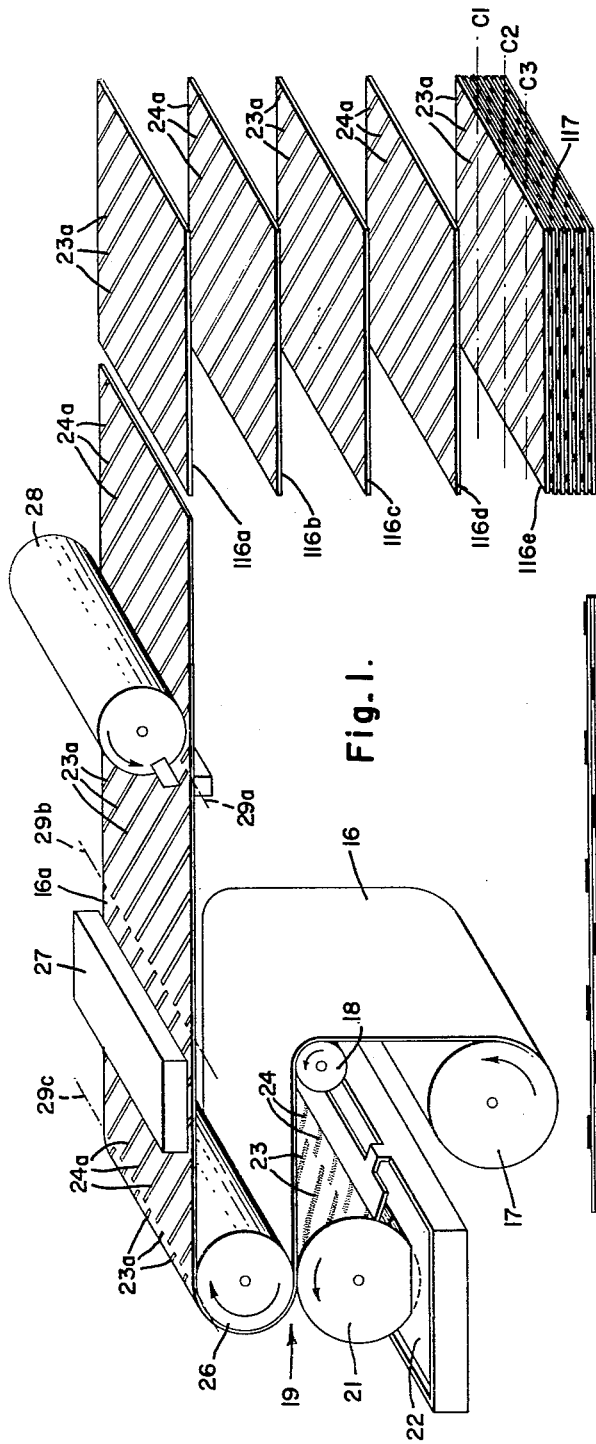
INVENTOR.
Kenneth M. Holland
BY
Townsend and Townsend
Attorneys United States Patent Office 3,006,798
Patented Oct. 31, 1961

3,006,798
METHOD OF MAKING HONEYCOMB
Kenneth M. Holland, Orinda, Calif., assignor to Hexcel Products, Inc., Berkeley, Calif., a corporation of California
Filed Mar. 23, 1959, Ser. No. 801,072
2 Claims. (Cl. 156—197)

This invention relates to a method of honeycomb manufacture and more particularly relates to a method of manufacturing a section of honeycomb having its cell openings disposed at an oblique angle relative to the median plane of the section.

Generally speaking, structural honeycomb is produced in flat panels or sections in which the cell openings are disposed perpendicular to the face surfaces of the section which is also normal to the lengthwise axes of the ribbons or webs from which the honeycomb is fabricated. For general instruction in the art of making honeycomb, reference is made to U.S. Patent Nos. 2,610,934; 2,674,295 and 2,734,843.

In certain applications however, it has been found desirable to provide honeycomb with cell openings disposed at an oblique angle with reference to the plane of the section. For instance, honeycomb material of this latter type has been found useful in air (or other fluid) directionalizing applications.

By way of example, where it is desired to turn the flow of air from a straight line path, honeycomb with its cells oriented angularly in the direction of the turn functions to redirectionalize the air flow with comparatively low loss in velocity. The honeycomb material columnarizes the air stream and maintains the air molecules travelling in a substantially linear path with a minimum of eddying, backwash or swirl. Conventional honeycomb used in such applications may be made of thin gauge ribbon material, such as .002 inch aluminum foil and fabricated in desired cell size, e.g. ¼"–¾" size.

Heretofore, honeycomb that has been specially fabricated with the axes of its cell openings disposed obliquely angularly with respect to the face surfaces of the material has been rather expensive to produce. The reason for this is that in conventional practice, honeycomb has been made in the form of relatively large rectangular "parent" blocks with the axes of the honeycomb cells all disposed parallel to one of the planar axes of the rectangular section. In order to obtain honeycomb slices with the cells oriented at an oblique angle with reference to any planar surface of the slice, it has been necessary to saw or slice the parent block of honeycomb along diagonal cut lines disposed obliquely angularly with reference to the axes of the honeycomb cells and with reference to the planar surfaces of the rectangular block. This method of fabrication is extremely wasteful of material because it is necessary to cut away and dispose of as waste the rather large corner sections of the rectangular block before obtaining diagonal slices of usable size. Further, and as will be obvious from an understanding of the method above described, because the slices of honeycomb are removed by progressive diagonal cuts into the rectangular parent block, each slice will be of a different size than every adjacent slice.

A principal object of the present invention is to provide a method of manufacturing a honeycomb section having the axes of its cells disposed at an oblique angle relative to the median plane of the section. The method embraces the concept of providing a plurality of rectangular sheets of web material of equal dimension and superposing said sheets, one upon the other in a stack and uniting them to one another along spaced parallel bonding lines which extend generally in a diagonal direction relative to the rectangular sheets, and with the bonding lines uniting alternate sheets being staggered relative to one another. When a stack or pack of material of the above character is expanded or opened out, the result will be a rectangular section of honeycomb having its cell axes disposed at an oblique angle with reference to the planar space surfaces of the said section.

Other numerous objects and advantages of the invention will become apparent upon reading the following specification and referring to the accompanying drawings in which similar characters of reference represent corresponding parts in each of the several views.

In the drawings:

FIG. 1 discloses schematically one suitable apparatus for practicing the method;

FIG. 2 is an end elevational view of an unexpanded stack of material produced according to the equipment of FIG. 1;

FIG. 3 is a fragmentary top plan view of an expanded section of the material shown in FIG. 2;

FIG. 4 is a longitudinal sectional view taken substantially on line 4—4 of FIG. 3.

A honeycomb section indicated generally at 10 in FIGS. 3 and 4 comprises a plurality of individual sinusoidally curved or corrugated webs or ribbons 11 bonded together node to node as at 12 by a suitable adhesive to define substantially hexagonal shaped cell openings 13. The ribbons or webs 11 extend in a substantially common direction which determines one major axis of the honeycomb section and which is sometimes referred to as the "ribbon direction" of the honeycomb material. As shown in FIG. 4, the axes of the cells 13 are disposed parallel to one another and at an oblique angle (approximately 60°) with reference to the median plane of the section.

FIG. 1 illustrates one continuous method of producing the article shown in FIGS. 3 and 4. The reference numeral 16 indicates a continuous web of sheet material, such as metal foil, paper, sheet plastic, resin impregnated textile or glass fabric, or the like, being fed from a continuous roll 17 over a guide roller 18 and through an adhesive applicating station indicated generally at 19. More specifically, station 19 comprises a rotogravure type applicating cylinder 21 mounted with its lower periphery submerged in a bath of liquid adhesive 22. The circumference of the drum or cylinder 21 is provided with etched lines 23 and 24 which define the pattern of glue lines to be applied to surface 16a of the continuous web as the latter moves between the gravure drum 21 and a conventional backup roller 26. In the example shown in FIG. 1 the etched lines 23 extend half way around the periphery of drum 21 along parallel axes disposed 45° to the rotational axes of the drum; whereas etched lines 24 extend around the other half of the circumference of the drum at a 45° angle to the axis of the drum. As is indicated, the axes of lines 23 are parallel but staggered in reference to the axes of etched lines 24. Rotation of the drum through 180° will cause adhesive lines 23a to be applied to surface 16a of the web, whereas rotation of the drum through its other half cycle will cause adhesive lines 24a to be imprinted thereon. As shown in FIG. 1, the pattern of the etched lines 23 and 24 apply, respectively, glue lines 23a in parallel but staggered relation with reference to glue lines 24a.

To facilitate cutting and stacking of the sheet material with the adhesive lines applied thereto, it is feasible to use a suitable type of thermoplastic adhesive that may be temporarily dried to a substantially non-tacky condition by running the web through or past a suitable oven or heat applying station indicated schematically at 27.

The continuous web may be cut into rectangular sheets of equal dimension by a suitable cutter mechanism indicated at 28. In the specific method taught, the web material is sheared along spaced transverse cut lines 29a, b. and c, which are coincident with the line of juncture between glue lines 23a and 24a as said lines appear in repeated pattern throughout the length of the web.

The end result of the above process is to provide rectangular sheets of web material of equal dimension such as indicated at 116a–e and which said sheets are provided with diagonal bonding lines 23a and 24a. The sheets are superposed in a stack 117 and united to one another along the spaced parallel bonding lines 23a and 24a but with the bonding lines uniting each sheet with the first adjacent sheet being staggered relative to the bonding lines uniting said sheet with a second adjacent sheet. If a thermoplastic adhesive is employed as heretofore suggested, the stack of material 117 may be placed in an oven press to heat the stack sufficiently to cause the bonding line 23a and 24a to flow and thereby adhesively bond all of the sheets in the stack to one another in the manner described.

The entire stack 117 may be expanded or opened out into cellular pattern, or the stack 117 may be sawed or sheared along parallel cut lines $C_1$, $C_2$, $C_3$, to form individual smaller sections or slices of the honeycomb material which are capable of being expanded or opened out into a cellular structure resembling the honeycomb material shown in FIGS. 3 and 4 and previously described.

It will be appreciated from the foregoing description that the present method of manufacturing honeycomb having its cell axes oriented with reference to the face surfaces of the material, does not, like the hereinabove described prior art techniques, require the trimming or cutting off of waste material in order to obtain sections of usable and uniform size.

It is appreciated that the method of producing the product herein described may be accomplished by hand or in other ways and on other equipment than herein specifically described. The angle at which it is desired to orient the axes of the cell openings relative to the median plane (or planar surfaces) of the expanded honeycomb section may, of course, be determined and varied by varying the oblique angle at which the adhesive lines are applied to the sheets before stacking, and/or by varying the angle or direction of the cut lines $C_1$, $C_2$, or $C_3$ relative to the axes of the adhesive lines in the stack.

Although the foregoing invention has been described in some detail by way of illustration and example for purposes of clarity of understanding, it is understood that certain changes and modifications may be practiced within the spirit of the invention and scope of the appended claims.

I claim:

1. A method of manufacturing a honeycomb section having the axes of its cells disposed at an oblique angle relative to the median plane of the section comprising the steps of: applying to rectangular sheet material spaced parallel lines of adhesive in a direction extending at an oblique angle in reference to both major axes of the rectangular sheet; providing a plurality of rectangular sheets of web material of equal dimension with the oblique lines applied thereto as aforesaid; superposing and adhesively uniting said sheets one upon the other in a stack with the spaced parallel lines of adjacent sheets staggered relative to one another; subsequently expanding the adhesively united sheet material into honeycomb with the axes of its cells disposed at an oblique angle relative to the open cell face surfaces of the honeycomb.

2. The method of claim 1, and wherein the lines of adhesive are applied to one surface only of one continuous web of material in successive group patterns appearing longitudinally of the web and with the axes of the adhesive lines of each group disposed parallel but in staggered relation to the axes of adhesive lines of each adjacent group; and wherein, further, the continuous web is cut into sections of equal dimension along successive transverse cut lines coincident with the boundaries between each successive group of adhesive lines; and wherein, further, said cut sections are consecutively superposed and adhered to one another to form a said stack as aforesaid.

References Cited in the file of this patent

UNITED STATES PATENTS

| | | |
|---|---|---|
| 685,780 | Martin | Nov. 5, 1901 |
| 2,428,979 | May | Oct. 14, 1947 |
| 2,649,131 | Lincoln | Aug. 18, 1953 |
| 2,684,316 | Warshaw | July 20, 1954 |
| 2,728,479 | Wheeler | Dec. 27, 1955 |